United States Patent
Sugawara (10) Patent No.: US 7,182,500 B2
(45) Date of Patent: Feb. 27, 2007

(54) LIQUID CRYSTAL DISPLAY MODULE AND BACK LIGHT FOR THE SAME

(75) Inventor: Hideaki Sugawara, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 156 days.

(21) Appl. No.: 11/087,590

(22) Filed: Mar. 24, 2005

(65) Prior Publication Data
US 2005/0212991 A1    Sep. 29, 2005

(30) Foreign Application Priority Data
Mar. 25, 2004    (JP) .............................. 2004-089752

(51) Int. Cl.
*F21V 7/04* (2006.01)
*G02F 1/1333* (2006.01)

(52) U.S. Cl. ...................... 362/634; 362/559; 362/267; 349/58

(58) Field of Classification Search ................ 362/611, 362/26, 27, 600, 632–634, 559–561, 330, 362/362, 367, 375, 374, 389, 457, 267, 158; 349/58, 60, 65, 1, 16, 17; 361/681; 385/901
See application file for complete search history.

(56) References Cited

U.S. PATENT DOCUMENTS

| 5,659,376 | A | * | 8/1997 | Uehara et al. ................. 349/58 |
| 5,838,401 | A | * | 11/1998 | Uehara ......................... 349/58 |
| 6,055,029 | A | * | 4/2000 | Kurihara et al. ............. 362/633 |
| 7,057,678 | B2 | * | 6/2006 | Ishida et al. .................. 349/58 |
| 7,126,650 | B2 | * | 10/2006 | Nagahama ................... 349/58 |
| 2004/0004680 | A1 | * | 1/2004 | Kim ............................ 349/58 |

FOREIGN PATENT DOCUMENTS

| JP | 2003-5658 A | 1/2003 |
| KR | 2003-0043570 A | 6/2003 |
| KR | 2003-0079421 A | 10/2003 |

* cited by examiner

*Primary Examiner*—Sandra O'Shea
*Assistant Examiner*—Bao Q. Truong
(74) *Attorney, Agent, or Firm*—Sughrue Mion, PLLC

(57) ABSTRACT

An elastic member (3b) is fixed to a space between a front surface of an intermediate frame (4a) and a rear surface of a liquid crystal panel (2) constituting a liquid crystal display module (12), or a space between a rear surface of an upper frame (1) and the rear surface of the liquid crystal panel (2) constituting the liquid crystal display module (12). Alternatively, the elastic members (3b) are fixed to both of the spaces. A peak portion (14a) of the elastic member (3b) is formed to possess a flexible structure. The liquid crystal display module is configured to hermetically seal the space between a back light (11a) and the liquid crystal panel (2), the space between the upper frame (1) and the liquid crystal panel (2), or both of the spaces.

16 Claims, 9 Drawing Sheets

LIQUID CRYSTAL DISPLAY MODULE AND BACK LIGHT FOR THE SAME

BACKGROUND OF THE INVENTION

1. Field of the Invention

The present invention relates to a liquid crystal display module and a back light for the same. More specifically, the present invention relates to a liquid crystal display module and a back light for the same having a dust-proof structure.

2. Description of the Related Art

A display device configured to integrate a liquid crystal panel with an illumination panel to enhance a dust-proof effect of a liquid crystal display module has been disclosed in Japanese Unexamined Patent Publication No. 2003-005658 (p. 2–3, FIG. 3 and FIG. 5), for example.

The display device disclosed in the publication includes a display unit which maintains a constant space between a display panel and an illumination panel for illuminating the display panel by use of a frame body. This display unit is covered with a protection cover unit. In particular, the frame body is made of a flexible member and protrusions are integrally formed on the frame body so as to fill the space between the protection cover and the frame body.

However, this display device adopts the structure of the frame body and an illumination mode of a front light version. Accordingly, application of this display device is limited to small-sized liquid crystal display products such as a portable terminal. It is difficult to apply the display device disclosed in the publication to medium-sized liquid crystal display products such as a notebook personal computer or to large-sized liquid crystal display products such as a PC monitor or a television.

There are two options applicable to the above-mentioned medium-sized or large-sized liquid crystal display devices for achieving the dust-proof effect, which are described below.

Figure 1:
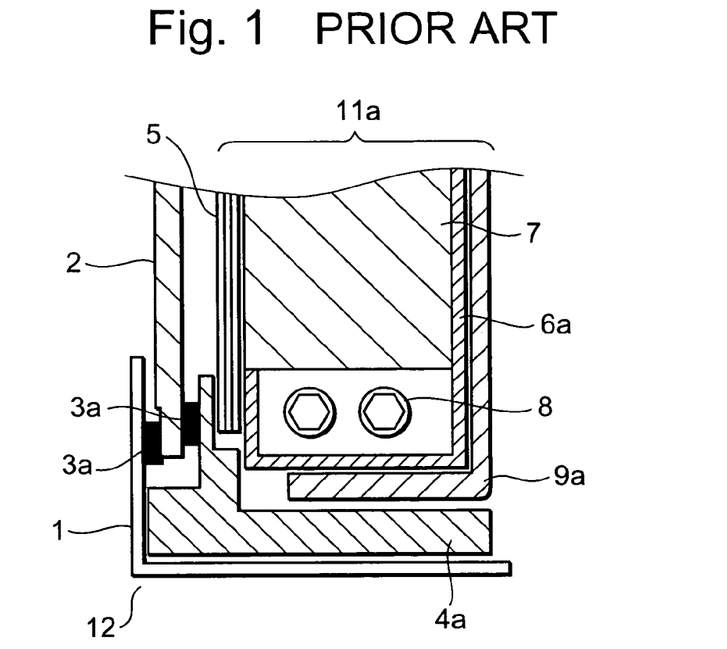
FIG. 1 is a cross-sectional view of a liquid crystal display module adopting a side type back light, which represents a conventional example.

Firstly, FIG. 1 is a cross-sectional view of a liquid crystal display module adopting a side type back light representing a conventional example. Here, only the left half of the liquid crystal display module is illustrated herein as the liquid crystal display module has a substantially symmetrical shape.

Referring to FIG. 1, a liquid crystal display module 12 of a first conventional type includes a liquid crystal panel 2, a back light mechanism 11a for providing illumination light to this liquid crystal panel 2 from backside, and a frame mechanism. Moreover, particularly, inside a lower frame 9a of a box shape, the back light mechanism 11a includes lamps 8 as light sources, a reflector 6a for reflecting illumination light from the lamps 8, an optical waveguide 7 for guiding this illumination light to the backside of the liquid crystal panel 2, and an optical sheet 5 disposed to cover part of upper ends of this optical waveguide 7 and the reflector 6a. Meanwhile, for the purpose of protection against dust or impact, the frame mechanism includes an upper frame 1, an intermediate frame 4a, and the lower frame 9a for covering the periphery and upper and lower surfaces.

The back light mechanism 11a thus configured is called a side type back light because the lamps 8 are disposed on the side (hereinafter referred to as the side type back light 11a) Meanwhile, there is also a mode (a front light mode) regarding a small and thin liquid crystal display module which is configured to supply the illumination light from a front face side of the liquid crystal panel 2. However, consideration will be made herein only for the back light mode.

Moreover, in this liquid crystal display module 12, an elastic member 3a is fixed between the rear face of the liquid crystal display module 12 and the intermediate frame. 4a to maintain air tightness between the liquid crystal panel 2 and the side type back light 11a in light of dust protection.

This elastic member 3a is formed into a rectangular cross section and besides is fixed to a projecting flat surface of the intermediate frame 4a constituting the back light 11a with a double-faced tape. That is, this elastic member 3a is fixed to the flat surface opposed to the liquid crystal panel 2 with the double-faced tape. As a result, the liquid crystal panel 2 is mounted so as to contact the elastic member 3a.

For this reason, in a large-sized liquid crystal panel, for example, there is a risk that a gap is formed partially between the liquid crystal panel 2 and the elastic member 3a when planarity of a surface of the liquid crystal panel 2 contacting the elastic member 3a is compromised due to slight warpage. Moreover, when the liquid crystal display module 12 is used in the state placed upright on a floor surface and then tilted to some extent, the liquid crystal panel 2 comes close to the rear surface of the upper frame 1 and it becomes further prone to forming a gap between the liquid crystal panel 2 and the elastic member 3a. In this case, it is not possible to prevent intrusion of dust completely.

In the meantime, the elastic member 3a of the liquid crystal display module 12 is fixed to the rear surface of the upper frame 1 opposed to a display surface of the liquid crystal panel 2 with a double-faced tape. Moreover, a surface of the elastic member 3a opposed to the liquid crystal panel 2 comes close to the display surface of the liquid crystal panel 2. Here, since there is the gap between the liquid crystal panel 2 and the elastic member 3a, it is not possible to prevent intrusion of dust completely. Furthermore, in an attempt to reduce the gap between the liquid crystal panel 2 and the elastic member 3a as much as possible, the liquid crystal panel 2 and the elastic member 3a may completely abut on each other depending on quality of members such as the upper frame 1, and thereby puts a load on the liquid crystal panel 2. Therefore, the display performance of the liquid crystal panel 2 may be adversely affected, which may cause deterioration in display quality or yields.

Figure 2:
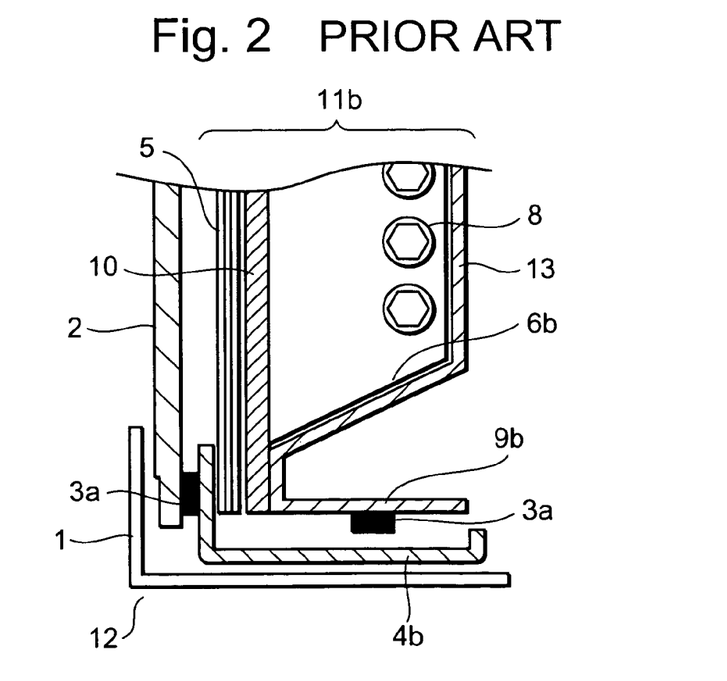
FIG. 2 is a cross-sectional view of a liquid crystal display module adopting a direct back light, which represents another conventional example.

Next, a liquid crystal display module of a second conventional type will be described. FIG. 2 is a cross-sectional view of a liquid crystal display module adopting a direct back light, which represents the liquid crystal display module of the second conventional type. Here, only substantially the left half of the liquid crystal display module 12 is illustrated herein as the liquid crystal display module also has a substantially symmetrical shape. Moreover, a direct back light 11b includes lamps 8 at the bottom of a reflector 6b, that is, directly below the liquid crystal panel 2. Accordingly, this is referred to as direct back light structure.

The liquid crystal display module 12 using this direct back light 11b includes the liquid crystal panel 2, the direct back light 11b, and a frame mechanism having an upper frame 1, an intermediate frame 4b, and a lower frame 9b. Inside the lower frame 9b, the direct back light 11b includes the lamps 8, and the reflector 6b for reflecting light emitted from these lamps 8 and directing the light efficiently to the liquid crystal panel 2 side through a diffuser 10 and an optical sheet 5.

In this liquid crystal display module 12,, an elastic member 3a having a rectangular cross section is fixed to a side surface of a lamp holder set 13 rendered detachable outward therefrom with a double-faced tape. Moreover, a constant gap is formed between the elastic member 3a and the intermediate frame 4b.

This gap between the elastic member 3a and the intermediate frame 4b is necessary for preventing detachment of members, interference, scratches and the like when detaching the lamp holder set 13. However, since there is no shielding from outside space, dust may intrude from the gap and the dust may reach the rear surface of the diffuser 10 or the front surface of the optical sheet 5, thereby causing deterioration in display quality or yields.

The above-described display device disclosed in Japanese Unexamined Patent Publication No. 2003-005658 intends to enhance dust-proof effect in a small-sized display instrument such as a portable terminal. Particularly, the illumination mode in this display device is of the front light type. That is, this is the type configured to locate an illumination panel above (in front of) a display panel. In this small-sized display instrument, the dust-proof effect is enhanced by providing a frame body with protrusions. This conventional example is intended for preventing intrusion of dust between the rear surface of a sensor device such as a touch panel and the front surface of a front light (an illumination panel), and is not intended for preventing intrusion of dust inside a liquid crystal display module such as a space between the rear surface of a liquid crystal panel and an optical sheet.

Moreover, since this display device includes the flexible frame body, the display device has poor rigidity. Therefore, from the viewpoints of protection of optical members and assembly performances, such a display device is hardly applicable to middle-sized or large-sized liquid crystal products. In addition, the frame body in this display device includes a protruded portion which is integrally formed thereon. Accordingly, a long period of time and high costs are required to modify the shapes of the frame body and the protruded portion.

Furthermore, in the conventional liquid crystal display modules explained with reference to FIG. 1 and FIG. 2, there is a gap between the elastic member and a member opposed to the elastic member. Accordingly, dust may intrude and deteriorates the display quality and the yields.

The present invention has been made in consideration of the foregoing problems. It is an object of the present invention to provide a liquid crystal display module and a back light for the same, which are capable of preventing intrusion of dust and enhancing display quality, vibration resistance, and impact resistance without adversely affecting a display condition of a screen by use of an elastic member represented by silicone rubber.

SUMMARY OF THE INVENTION

A liquid crystal display module of the present invention includes a liquid crystal panel, a back light for functioning as a light source and mounting the liquid crystal panel, an upper frame for surrounding and protecting the liquid crystal panel and the back light, and an elastic member having flexibility which is fitted to the front surface of the back light so as to surround a display portion of the liquid crystal panel. Here, a gap between the liquid crystal panel and the back light is hermetically sealed by allowing a peak portion of the elastic member to contact the liquid crystal panel. The elastic member is fitted to at least one edge of the front surface of the back light corresponding to the periphery of the display portion of the liquid crystal panel.

Meanwhile, another liquid crystal display module of the present invention includes a liquid crystal panel, a back light for functioning as a light source and mounting the liquid crystal panel, an upper frame for surrounding and protecting the liquid crystal panel and the back light, and an elastic member having flexibility which is fitted to the rear surface of the upper frame for protecting the liquid crystal panel so as to surround a display portion of the liquid crystal panel. Here, a gap between the upper frame and the liquid crystal panel is hermetically sealed by allowing a peak portion of the elastic member to contact the liquid crystal panel. This elastic member is fitted to at least one edge of the rear surface of the upper frame corresponding to the periphery of the display portion of the liquid crystal panel.

Further, another liquid crystal display module of the present invention includes a liquid crystal panel, a back light for functioning as a light source and mounting the liquid crystal panel, an upper frame for surrounding and protecting the liquid crystal panel and the back light, a first elastic member having flexibility which is fitted to a front surface of the back light so as to surround a display portion of the liquid crystal panel, and a second elastic member having flexibility which is fitted to a rear surface of the upper frame for protecting the liquid crystal panel so as to surround the display portion of the liquid crystal panel. Here, peak portions of the first and second elastic members are respectively brought into contact with the liquid crystal panel. In this way, a gap between the liquid crystal panel and the back light and a gap between the upper frame and the liquid crystal panel are hermetically sealed. The elastic members are fitted to at least one edge of the front surface of the back light and at least one edge of the rear surface of the upper frame respectively corresponding to the periphery of the display portion of the liquid crystal panel.

The elastic member in the above-described liquid crystal display modules may be formed by use of resin having flexibility and elasticity as represented by silicone rubber.

Meanwhile, the elastic member in the above-described liquid crystal display modules is formed into a shape so as to allow the peak portion to be deformed or tilted when the peak portion is brought into contact with an opposed member in order to hermetically seal a gap between a fitting member to be fitted and the opposed member to be opposed to the fitting member while suppressing a load on the opposed member.

Meanwhile, a back light used in a liquid crystal display module of the present invention includes direct lamps arranged parallel to a display surface, a reflector for reflecting light emitted from the lamps and directing the light to a display side through a diffuser, and a lower frame for housing the direct lamps and the reflector. In addition, the back light used in a liquid crystal display module of the present invention includes a lamp holder set rendered detachable outward from the liquid crystal display module, and is configured to fit an elastic member having flexibility to any of a front side surface of the lamp holder set and a rear side surface of an intermediate frame constituting a frame after detaching the lamp holder set. In this way, a gap between the lamp holder set and the intermediate frame is hermetically sealed.

The liquid crystal display module and the back light for the same of the present invention can achieve dust-proof, vibration resistant, and impact resistant properties which are higher than those in a conventional liquid crystal display module by utilizing the peak portion of the elastic member. Particularly, in a liquid crystal display module adopting a direct back light, lamps can be easily replaced while maintaining the dust-proof property. Accordingly, it is possible to realize a highly reliable liquid crystal display module and a highly reliable back light while maintaining display quality.

BRIEF DESCRIPTION OF THE DRAWINGS

FIG. 12 is a perspective view of an elastic member shown in FIG. 3, FIG. 4, and the like.

DETAILED DESCRIPTION OF THE PREFERRED EXEMPLARY EMBODIMENTS

The invention will be now described herein with reference to illustrative embodiments. Those skilled in the art will recognize that many alternative embodiments can be accomplished using the teachings of the present invention and that the invention is not limited to the exemplary embodiments illustrated for explanatory purposes.

The present invention applies an elastic member made of silicone rubber, for example, and having a triangular shape in which a peak in a longitudinal cross section is tapered more than a base portion. Moreover, the elastic member prevents intrusion of dust without adversely affecting a display condition of a screen. In other words, the elastic member improves display quality, vibration resistance, and impact resistance.

The exemplary embodiments of the present invention include first to sixth embodiments. The first exemplary embodiment (FIG. 3 and FIG. 4) is an example of disposing the elastic member between a liquid crystal panel and an intermediate frame. The second exemplary embodiment (FIG. 5 and FIG. 6) is an example of disposing the elastic member between the liquid crystal panel and an upper frame. The third exemplary embodiment (FIG. 7, FIG. 8, and FIG. 9) is an example of disposing the elastic members respectively between the liquid crystal panel and the intermediate panel and between the liquid crystal panel and the upper frame.

Figure 14:
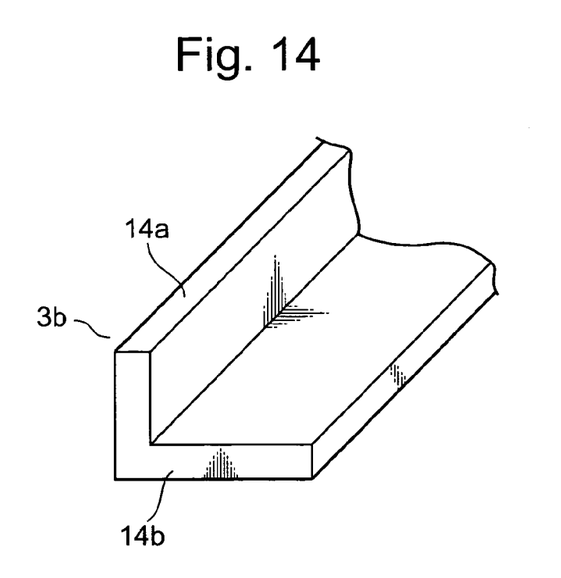
FIG. 14 is a view showing another modified example of the elastic member in FIG. 12.
Figures 15A, 15B:
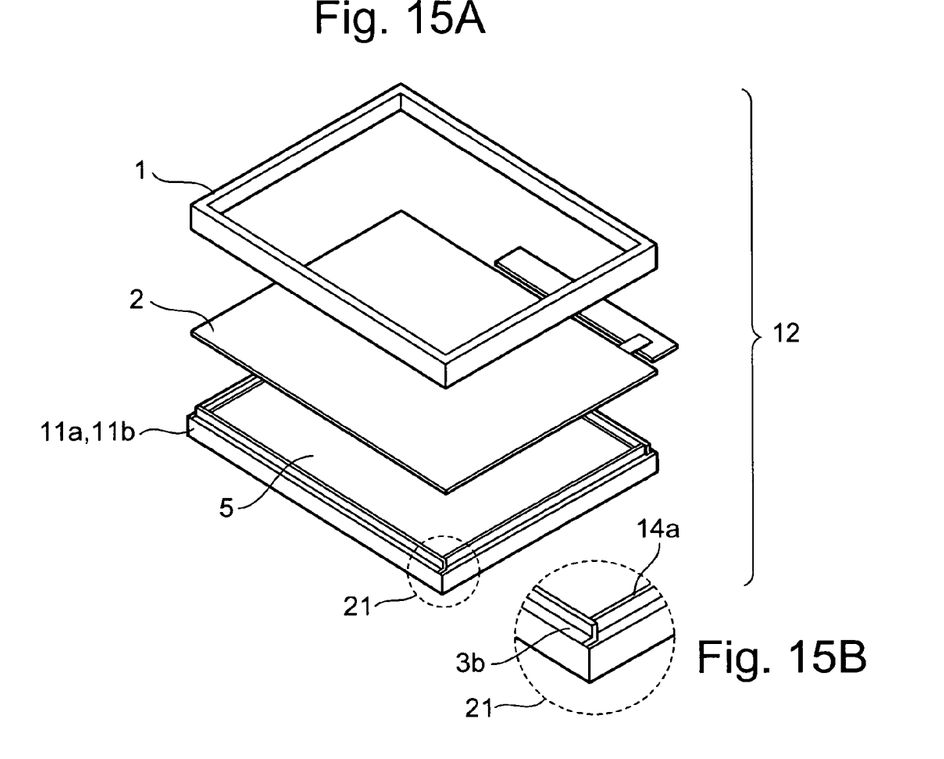
FIG. 15A is an exploded perspective view of a liquid crystal display module for describing a sixth exemplary embodiment of the present invention.
FIG. 15B is a detailed view of a corner portion 21 in FIG. 15A.

The exemplary embodiments of the present invention can be also categorized into the fourth exemplary embodiment (FIG. 10), the fifth exemplary embodiment (FIG. 11), and the sixth exemplary embodiment (FIG. 15A). Meanwhile, concrete structures of the elastic member are shown in FIG. 12 to FIG. 14, FIG. 16, and FIG. 17A to FIG. 17C. Now, the exemplary embodiments of the present invention will be described in detail with reference to the accompanying drawings.

Figure 3:
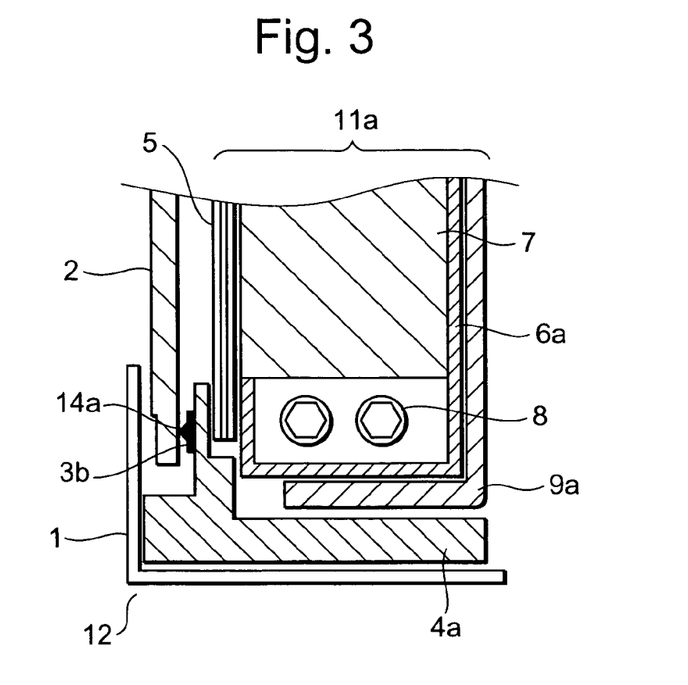
FIG. 3 is a cross-sectional view of a liquid crystal display module for describing a first example in a first exemplary embodiment of the present invention.

FIG. 3 is a cross-sectional view of a liquid crystal display module for describing a first example in the first exemplary embodiment of the present invention. As shown in FIG. 3, a liquid crystal display module 12 of the first example in this embodiment represents a case where illuminating means is of a side back light type.

This liquid crystal display module 12 includes a liquid crystal panel 2, and a back light mechanism 11a for providing illumination light from a rear surface side of this liquid crystal panel 2. Moreover, this liquid crystal display module 12 includes a frame mechanism, which has an upper frame 1, an intermediate frame 4a, and a lower frame 9a, for covering the periphery and upper and lower surfaces to protect the liquid crystal display module 12 from dust and impact. In particular, inside the lower frame 9a formed into a box shape, the back light mechanism 11a includes laterally arranged lamps 8 as light sources, and a box-shaped reflector 6a for reflecting illumination light from the lamps 8. Further, the back light mechanism 11a includes an optical waveguide 7 for guiding this illumination light to the rear surface side of the liquid crystal panel 2, and an optical sheet 5 disposed so as to cover part of upper ends of this optical waveguide 7 and of the reflector 6a. This optical waveguide 7 is provided for propagating the light reflected by the reflector 6a uniformly to the screen. Meanwhile, the optical sheet 5 is provided for efficiently diffusing, focusing, and polarizing the light obtained from the optical waveguide 7.

A characteristic of this embodiment is that the liquid crystal display module includes an elastic member 3b, which is configured to fix a bottom surface thereof to a front surface of the intermediate frame 4a holding this back light mechanism 11a so as to surround a display portion of the liquid crystal panel 2 and to dispose a peak 14a thereof to contact the rear surface of the liquid crystal panel 2. Here, the upper frame 1 is fitted so as to surround the side type back light 11a, the intermediate frame 4a, and the liquid crystal panel 2.

Specifically, the side type back light 11a formed by members such as the intermediate frame 4a for holding members such as the lamps 8, the reflector 6a and the optical waveguide 7, and the lower frame 9a has elasticity such as silicone rubber. Moreover, the side type back light 11a includes the elastic member 3b of the triangular shape, which has the peak in the longitudinal cross section thereof tapered more than the base portion. At that time, the elastic member 3b is fixed to the front surface of the intermediate frame 4a so as to surround the display portion of the liquid crystal panel 2, and the liquid crystal panel 2 is mounted on the peak of the elastic member 3b.

In comparison with the above-described conventional example shown in FIG. 1, it is possible to use similar members for the respective members in the liquid crystal display module 12 of this example except that the elastic member 3b is different.

Figure 4:
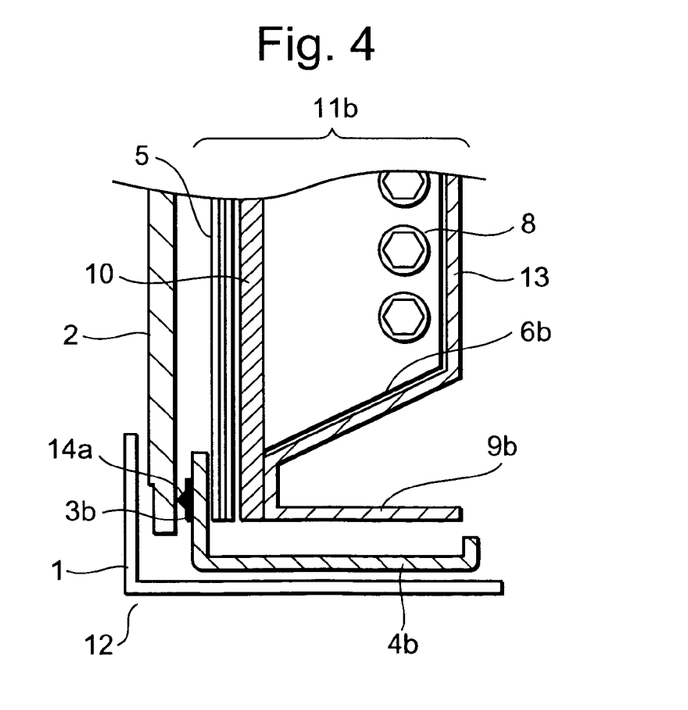
FIG. 4 is a cross-sectional view of a liquid crystal display module for describing a second example in the first exemplary embodiment of the present invention.

FIG. 4 is a cross-sectional view of a liquid crystal display module for describing a second example in the first embodiment of the present invention. As shown in FIG. 4, the liquid crystal display module 12 of the second example in this embodiment represents a case where illuminating means is of a direct back light type. This liquid crystal display module 12 includes the liquid crystal panel 2, a direct back light 11b, and a frame structure having the upper frame 1, an intermediate frame 4b, and a lower frame 9b for surrounding and protecting the respective members. In particular, inside the lower frame 9b, the direct back light 11b includes the lamps 8 arranged at the bottom, and a reflector 6b for reflecting light emitted from the lamps 8. Further, on the lower frame 9b, the direct back light 11b includes a diffuser 10 and the optical sheet 5 for directing the reflected light efficiently to the liquid crystal panel 2 side. Here, a lamp holder set 13, which is formed by mounting the lamps 8 and the reflector 6b on the lower frame 9b, has a structure rendered detachable outward.

A characteristic of this liquid crystal display module 2 is that the liquid crystal display module 2 includes the elastic member 3b, which is configured to fix the bottom surface thereof to a front surface of the intermediate frame 4b, and to dispose a peak thereof to contact the rear surface of the liquid crystal panel 2. Here, the direct back light 11b as well is formed by holding the members such as the lamps 8, the reflector 6b, and the lower frame 9b with the intermediate frame 4b.

As described above, the elastic member 3b is fixed to the front surface of the intermediate frame 4b so as to surround the display portion of the liquid crystal panel 2. At the same time, the liquid crystal panel 2 is mounted on the elastic member 3b and is held by the upper frame 1. In this way, the liquid crystal display module 12 or the direct back light 11b is configured. Meanwhile, as described previously, the elastic member 3b has elasticity such as silicone rubber and is formed into a triangular structure in which a peak in a longitudinal cross section is tapered more than a base portion.

In comparison with the above-described conventional example shown in FIG. 2, it is possible to use similar materials as the respective members in the liquid crystal display module 12 of this example except that the elastic member 3b is different.

In any of the first example and the second example in the first exemplary embodiment described above, the elastic member 3b constituting the liquid crystal display module 12 has the peak portion 14a which contacts the rear surface of the liquid crystal panel 2, to be mounted on the elastic member 3b which is the opposite surface to the front surface. As described previously, the cross-sectional shape of this peak portion 14a is the triangular shape, which can be slightly deformed or tilted upon contact with the liquid crystal panel 2. For this reason, when a display surface of the liquid crystal panel 2 is placed perpendicularly to a ground surface, the liquid crystal panel 2 comes close to the upper frame 1 and a space between the liquid crystal panel 2 and the back light 11a or 11b is increased. Even in this case, no gap is formed between the back light 11a or 11b and the liquid crystal panel 2 because the peak 14a of the elastic member 3b contacts the rear surface of the liquid crystal panel 2. Accordingly, it is possible to prevent intrusion of dust into a space between the liquid crystal panel 2 and the optical sheet 5, and thereby to enhance display quality and yields of the liquid crystal display module. In addition, due to flexibility of the peak portion 14a of the elastic member 3b, when the liquid crystal panel 2 repeatedly moves between the back light 11a or 11b and the upper frame 1 or when impact in a perpendicular direction to the display surface is applied to the liquid crystal display module 12, the liquid crystal panel 2 is protected by elasticity of the peak portion 14a of the elastic member 3b. Accordingly, it is possible to enhance vibration resistance and impact resistance.

Figure 5:
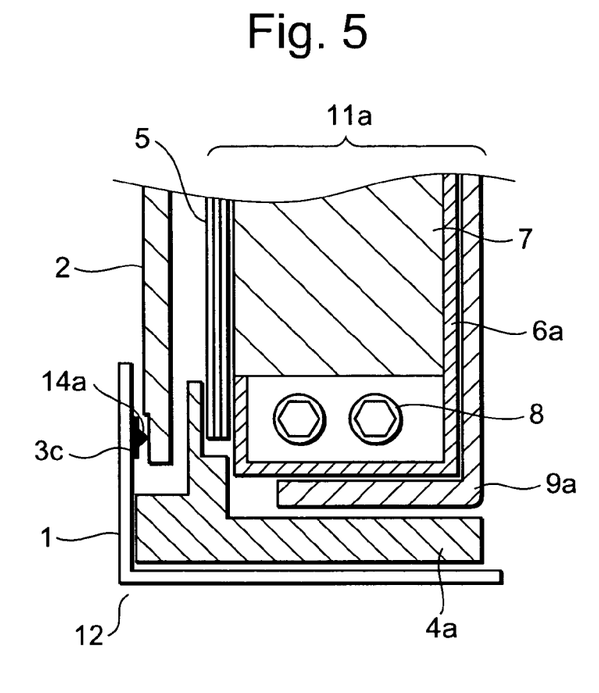
FIG. 5 is a cross-sectional view of a liquid crystal display module for describing a first example in a second exemplary embodiment of the present invention.
Figure 6:
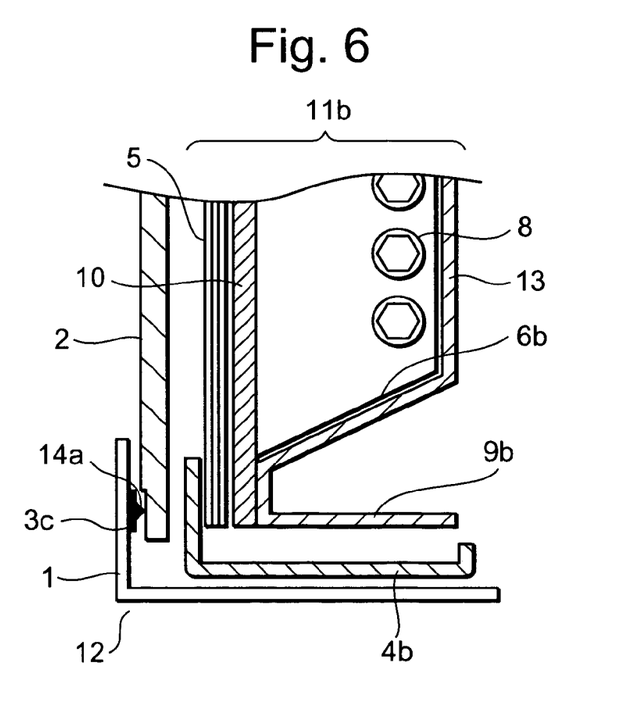
FIG. 6 is a cross-sectional view of a liquid crystal display module for describing a-second example in the second exemplary embodiment of the present invention.

FIG. 5 is a cross-sectional view of a liquid crystal display module for describing a first example in a second exemplary embodiment of the present invention, and FIG. 6 is a cross-sectional view of a liquid crystal display module for describing a second example in the second exemplary embodiment of the present invention.

Firstly, as shown in FIG. 5, the liquid crystal display module 12 in this exemplary embodiment includes a side type back light (also referred to as an edge type back light) 11a, and a liquid crystal panel 2. The liquid crystal display module 12 in this embodiment further includes an elastic member 3c which is fixed between a display surface of the liquid crystal panel 2 and a rear-surface of an upper frame 1 opposed thereto so as to surround a display portion of the liquid crystal panel 2. Moreover, a peak portion 14a of this elastic member 3c slightly contacts the liquid crystal panel 2. A cross-sectional shape of the peak portion 14a is a triangular shape, for example, which is rendered slightly deformable or tiltable when contacting the liquid crystal panel 2.

In the other example, as shown in FIG. 6, the liquid crystal display module 12 in this embodiment includes a direct back light 11b, the liquid crystal panel 2, and the elastic member 3c which is fixed to the rear surface of the upper frame 1 opposed to the display surface of the liquid crystal panel 2 so as to surround the display portion of the liquid crystal panel 2. Moreover, the peak portion 14a of this elastic member 3c slightly contacts the liquid crystal panel 2. The cross-sectional shape of the peak portion 14a is a triangular shape, for example. The cross-sectional shape of the peak portion 14a is rendered slightly deformable when contacting the liquid crystal panel 2. Alternatively, the cross-sectional shape of the peak portion 14a is rendered tiltable.

In these liquid crystal display modules 12 shown in FIG. 5 and FIG. 6, the elastic member 3c fills a gap between the upper frame 1 and the liquid crystal panel 2. Therefore, dust which is likely to intrude from the gap between the upper frame 1 and the liquid crystal panel 2 is blocked at the surface of the elastic member 3c. In other words, it is possible to prevent intrusion of dust into the space between the liquid crystal panel 2 and the optical sheet 5, and to enhance display quality and yields of the liquid crystal display modules 12. In addition, the peak portion 14a of the elastic member 3c is flexible. As a result, when the liquid crystal panel 2 repeatedly moves between the back light 11a or 11b and the upper frame 1 or when impact in a perpendicular direction to the display surface is applied to the liquid crystal display module 12, the liquid crystal panel 2 is protected by elasticity of the peak portion 14a of the elastic member 3c. Accordingly, it is possible to enhance vibration resistance and impact resistance.

As shown in FIG. 3 to FIG. 6, each of the liquid crystal display modules 12 in the first and second exemplary embodiments of the present invention includes any of the elastic members 3b and 3c which is capable of enhancement in vibration resistance and impact resistance in addition to enhancement in display quality and yields of the liquid crystal display modules 12. Moreover, the back light 11a or 11b to, be used in the liquid crystal display modules 12 may be either the side (edge) type back light 11a or the direct back light 11b as long as the back light can fix the elastic member 3b or 3c thereto. In this way, the present invention is applicable to various aspects irrespective of the light emitting mode of the back light.

Figure 7:
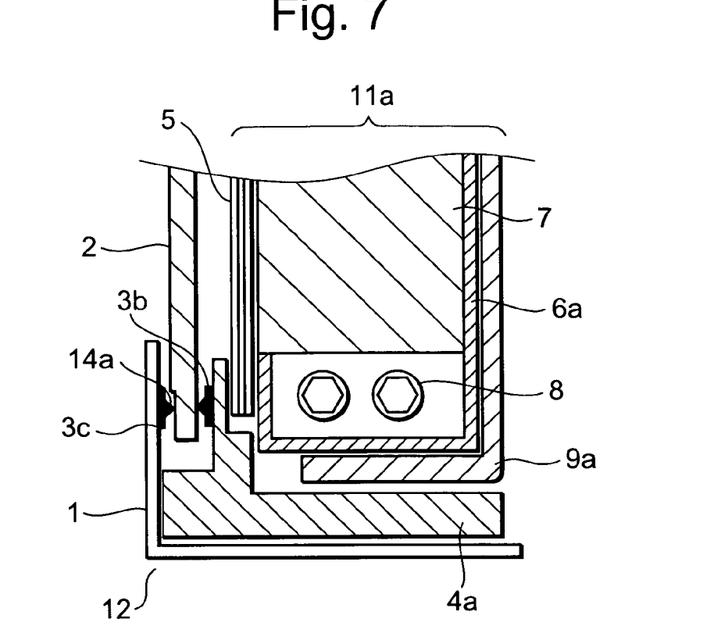
FIG. 7 is a cross-sectional view of a liquid crystal display module for describing a first, example in a third exemplary embodiment of the present invention.

FIG. 7 is a cross-sectional view of a liquid crystal display module for describing a first example in a third embodiment of the present invention. Meanwhile, FIG. 8 is a cross-sectional view of a liquid crystal display module for describing a second example in the third exemplary embodiment of the present invention.

As shown in FIG. 7, the liquid crystal display module 12 in this embodiment includes both of the elastic member 3b described in the first exemplary embodiment and the elastic member 3c described in the second exemplary embodiment. The liquid crystal display module 12 of this embodiment includes a liquid crystal panel 2, a side type back light 11a, a frame mechanism, and the two elastic members 3b and 3c. The side type back light 11a is formed by housing lamps 8, a reflector 6a, and an optical waveguide 7 inside a lower frame 9a and disposing an optical sheet 5 on the reflector 6a. Specifically, this embodiment adopts the structure in which the elastic member 3b is fixed to the front surface of an intermediate frame 4a and the elastic member 3c is fixed to the rear surface of an upper frame 1. Moreover, the peak portions 14a of both of the elastic members 3b and 3c contact the rear surface and the front surface of the liquid crystal panel 2, respectively.

Figure 8:
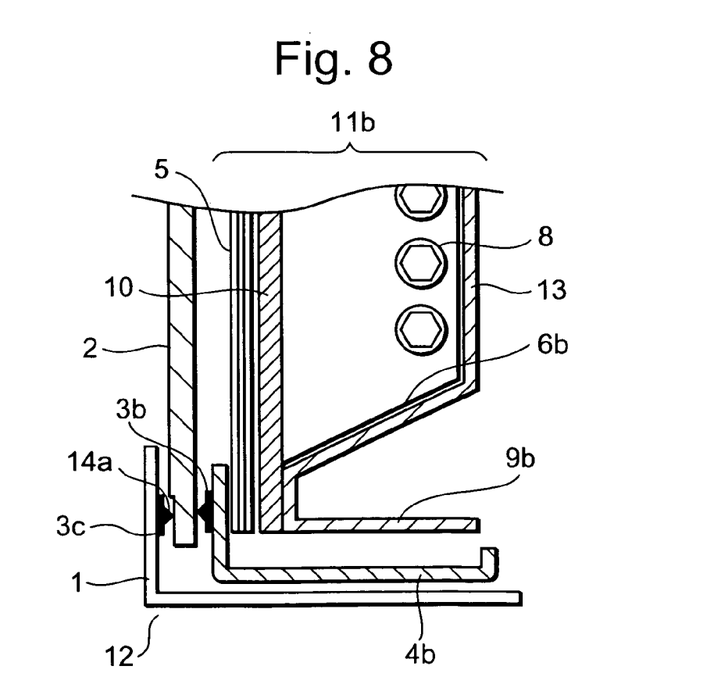
FIG. 8 is a cross-sectional view of a liquid crystal display module for describing a second example in the third exemplary embodiment of the present invention.

In the other example, as shown in FIG. 8, the liquid crystal display module 12 in this embodiment includes both of the elastic member 3b described in the first exemplary embodiment and the elastic member 3c described in the exemplary second embodiment. The liquid crystal display module 12 includes a back light 11b, the intermediate frame 4b for fixing the elastic member 3b thereto, the liquid crystal panel 2, and the upper frame 1 for fixing the elastic member 3c thereto.

In these liquid crystal display modules 12 shown in FIG. 7 and FIG. 8, the liquid crystal panel 2 is sandwiched by the elastic member 3b fixed to the back light 11a or 11b, and the elastic member 3c fixed to the rear surface of the upper frame 1. In this way, it is possible to fill the gap between the upper frame 1 and the liquid crystal panel 2 and the gap between the liquid crystal panel 2 and the back light 11a or 11b securely. Therefore, it is possible to obtain higher dust-proof effect than the liquid crystal display modules 12 described in the first exemplary embodiment and in the second exemplary embodiment.

In this embodiment, due to flexibility of the peak portions 14a of the elastic members 3b and 3c, when the liquid crystal panel 2 repeatedly moves between the back light 11a or 11b and the upper frame 1 or when impact in a perpendicular direction to the display surface is applied to the liquid crystal display module 12, the liquid crystal panel 2 is held between the upper frame 1 and the back light 11a or 11b. Therefore, it is possible to resolve the problems such as scratches on the liquid crystal panel 2, or destruction and display errors of the liquid crystal display module 12 by utilizing elasticity of the peak portions of the elastic members 3b and 3c. In short, this embodiment can obtain higher vibration resistant and impact resistant effects than the liquid crystal display modules 12 described in the exemplary first embodiment and in the exemplary second embodiment.

Figure 9:
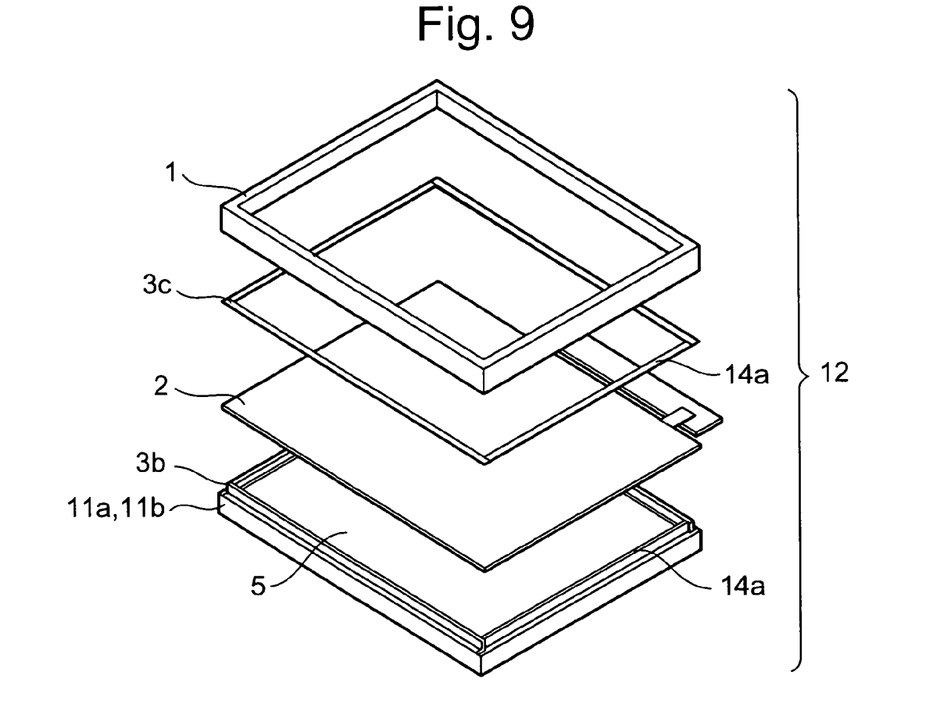
FIG. 9 is an exploded perspective view of the liquid crystal display modules shown in FIG. 7 and FIG. 8.

FIG. 9 is an exploded perspective view of the liquid crystal display modules shown in FIG. 7 and FIG. 8. As shown in FIG. 9, the above-described liquid crystal display module 12 according to the third exemplary embodiment adopts the structure to overlap the-upper frame 1, the elastic member 3c, the liquid crystal panel 2, and the back panel 11a (or 11b) provided with the optical sheet 5 and the elastic member 3b.

The above-described elastic member 3b according to the first exemplary embodiment is fixed to the periphery of the front surface of the back light 11a or 11b in a linear shape so as to surround the display portion of the liquid crystal panel 2. Moreover, the liquid crystal panel 2 is mounted on the peak portion 14a of the elastic member 3b. Subsequently, the elastic member 3c according to the exemplary second embodiment is fixed to the rear surface of the upper frame 1 opposed to the display surface of the liquid crystal panel 2 so as to surround the display portion of the liquid crystal panel 2. The peak portions 14a of these elastic members 3b and 3c contact the liquid crystal panel 2, and are formed into slightly deformable or tiltable shapes. For this reason, it is possible to fill the gap between the upper frame 1 and the liquid crystal panel 2 and the gap between the liquid crystal panel 2 and the back light 11a or 11b securely, and thereby to enhance air tightness in the space between the liquid crystal panel 2 and the optical sheet 5.

Figure 10:
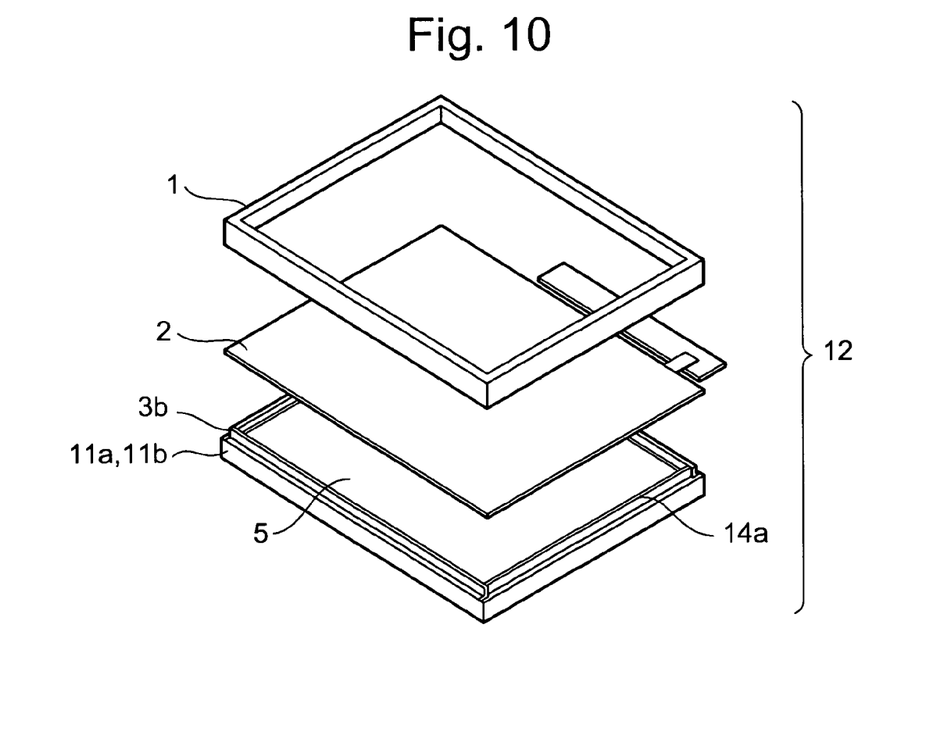
FIG. 10 is an exploded perspective view of a liquid crystal display module for describing a fourth exemplary embodiment of the present invention.

FIG. 10 is an exploded perspective view of a liquid crystal display module for describing a fourth exemplary embodiment of the present invention.

As shown in FIG. 10, the liquid crystal display module 12 in this embodiment includes a liquid crystal panel 2, a back light 11a (or 11b) in which an elastic member 3b having a peak portion 14a is formed only in a necessary position in the periphery, and an upper frame 1.

A route of intrusion of dust into this liquid crystal display module 12 varies depending on influence of heat generated by the lamps (not shown) or airflow around the liquid crystal panel 2, for example. Nevertheless, dust does not always intrude from all around an opening portion of the upper frame 1. For this reason, there is a case where it is not necessary to fix any of or both of the elastic member 3b and the elastic member 3c throughout the periphery of the display portion of the liquid crystal panel 2 as shown in the above-described first to third exemplary embodiments. Accordingly, it is possible to form the elastic member 3b or the elastic member 3c only in the portion that may suffer intrusion by estimating the route of intrusion of the dust. For example, it is possible to achieve dust-proof effect by fixing the elastic member 3b at least to one edge of the front surface of the back light 11a or 11b corresponding to the display portion of the liquid crystal panel 2, or to one edge of the rear surface of the upper frame 1.

In FIG. 10, the elastic member 3b according to the above-described first exemplary embodiment is fixed linearly to the front surface of the back light 11a (or 11b) so as to correspond to one edge of the display portion of the liquid crystal panel 2. That is, this embodiment can obtain the dust-proof effect if the portion that may suffer intrusion of the dust is located on the edge where the elastic member 3b is fixed. In addition, according to this embodiment, it is possible to reduce the number of members as compared to the above-described first to third exemplary embodiments, and thereby to reduce costs.

Figure 11:
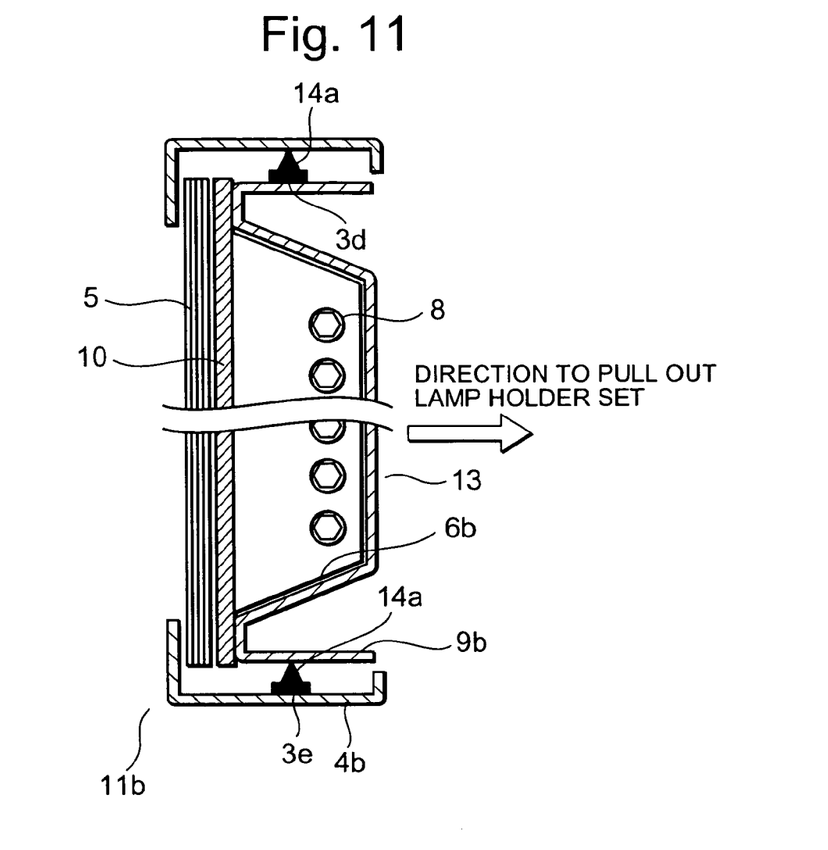
FIG. 11 is a cross-sectional view of a direct back light in a liquid crystal display module for describing a fifth exemplary embodiment of the present invention.

FIG. 11 is a cross-sectional view of a direct back light in a liquid crystal display module for describing a fifth exemplary embodiment of the present invention. As shown in FIG. 11, a direct back light 11b constituting the liquid crystal display module of this embodiment includes a lamp holder set 13 having lamps 8, a reflector 6b for reflecting light emitted from the lamps 8, and a lower frame 9b for fitting the reflector 6b and surrounding and protecting the optical members such as the lamps 8. This lamp holder set 13 includes a diffuser 10 and an optical sheet 5 mounted on the lower frame 9b. Moreover, it is possible to pull the lower frame out of an intermediate frame 4b in the direction indicated by an arrow. Here, as described previously, the diffuser 10 is configured to efficiently diffuse the light reflected by the reflector 6b, while the optical sheet 5 is configured to further diffuse, focus or polarize the light obtained from the diffuser 10.

In this embodiment, elastic members 3e and 3d, each having a triangular shape, are fixed to the intermediate frame 4b and the lower frame 9b, respectively. At the same time, peaks thereof contact the rear surfaces of the lower frame 9b and of the intermediate frame 4b.

The above-described elastic member 3d is fixed to a front side surface of the lower frame 9b opposed to the intermediate frame 4b, that is, to a side surface of the lamp holder set 13. The peak portion 14a of the elastic member 3d is formed into the shape, which is slightly deformable or tiltable upon contact with a rear side surface of the intermediate frame 4b opposed to the front side surface of the lamp holder set 13. Meanwhile, on the other front side surface of the lamp holder set 13 opposite to the side fixing this elastic member 3d, the elastic member 3e is fixed to the rear side surface of the intermediate frame 4b opposed to the lamp holder set 13. Then, the peak portion 14a thereof is brought into contact with the front side surface of the lamp holder set 13. Therefore, as similar to the elastic member 3d, the elastic member 3e is formed into a slightly deformable or tiltable shape.

Due to the above-described configuration, the direct back light 11b allows the entire lamp holder set 13 to be pulled out rearward in the opposite direction to the light emission side of the back light 11b, thereby enabling lamp replacement. In this direct back light 11b, it is necessary to provide a gap between the lamp holder set 13 and the intermediate frame 4b for the purpose of lamp replacement. For this reason, it is likely that dust may intrude from the gap between the lamp holder set 13 and the intermediate frame 4b and that the dust may further intrude into a space between the diffuser 10 and the reflector 6b where the lamps 8 are located, a space between the diffuser 10 and the optical sheet 5, or a space between the liquid crystal panel (not shown) and the optical sheet 5, thereby causing display error.

Therefore, the peak portions 14a of the elastic members 3d and 3e shown in FIG. 11 are configured to contact the rear side surface of the intermediate frame 4b opposed to the front side surface of the lamp holder set 13 and the front side surface of the lamp holder set 13 opposed to the rear side surface of the intermediate frame 4b, respectively. Since the elastic members 3d and 3e are formed into the slightly deformable or tiltable shapes, the elastic members 3d and 3e are fixed so as to fill the gap between the lamp holder set 13 and the intermediate frame 4b. Accordingly, this embodiment can prevent intrusion of dust from the gap between the lamp holder set 13 and the intermediate frame 4b. In addition, when the entire lamp holder set 13 is pulled out rearward in the opposite direction to the light emission side of the back light 11b for the purpose of replacement of the lamps or when fitting the lamp holder set 13 again, this embodiment facilitates lamp replacement by utilizing flexibility of the peak portions 14a of the elastic members 3d and 3e as compared to the above-described conventional example shown in FIG. 2 (the configuration using the elastic member 3a). Furthermore, according to this embodiment, it is possible to prevent problems such as damages, detachment, and, the like of members attributable to interference of the lamp holder set 13 with peripheral members of the lamp holder set 13 represented by the intermediate frame 4b.

Next, various elastic members to be fixed to the liquid crystal display modules according to the above-described first to fifth exemplary embodiments will be described. The above-described elastic members 3b, 3c, 3d, and 3e are only different in terms of object members to be fixed by fixing portions 14b. The shapes and the materials of the elastic members 3b, 3c, 3d, and 3e may be the same. Alternatively, it is possible to form only the fixing portions by use of different members. In the following description, the elastic member to be fixed to the liquid crystal display module 12 disclosed in the present invention will be represented by the elastic member 3b.

Figure 12:
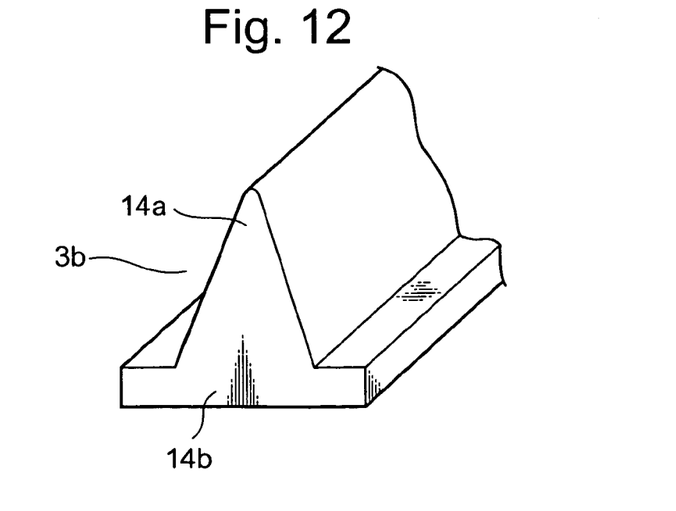

FIG. 12 is a perspective view of the elastic member shown in FIG. 3, FIG. 4, and the like. As shown in FIG. 12, in the liquid crystal display modules 12 according to the above-described first to fifth exemplary embodiments, the cross-sectional shape of the peak portion 14a of the elastic member 3b is the triangular shape in order to obtain the dust-proof effect and the vibration resistant and impact resistant effects. Moreover, the peak portion 14a is formed into the shape rendered deformable or tiltable upon contact with the liquid crystal panel 2 or the intermediate frame 4b. As for the material, the peak portion 14a is made of resin represented by silicone rubber. Accordingly, it is possible to manufacture the peak portion 14a easily by extrusion molding or casting. In addition, an apex portion of the peak portion 14a configured to contact the member such as the liquid crystal panel 2 is slightly rounded in consideration of formability and shape stability.

Meanwhile, the fixing portion 14b of the elastic member 3b is adhered to and fixed to the rear surface of the upper frame 1 or to the front surface of the back light 11a or 11b as described in the respective exemplary embodiments by means of providing an adhesive layer such a double-faced tape, for example. The bottom surface of this fixing portion 14b to be fixed to the rear surface of the upper frame or the front surface of the back light 11a or 11b has an area which is sufficient for suppressing influence of displacement or detachment of the elastic member 3b caused by deformation of the elastic member 3b attributable to rapid change in temperature or humidity. Here, in order to facilitate formation of the adhesive layer on the fixing portion 14b of the elastic member 3b, it is desirable to form the bottom surface of the fixing portion 14b into a flat surface.

Figure 13A:
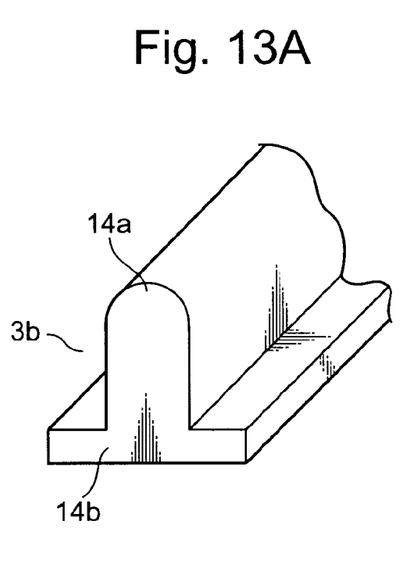
FIG. 13A and FIG. 13B are views showing modified examples of the elastic member in FIG. 12.
Figure 13B:
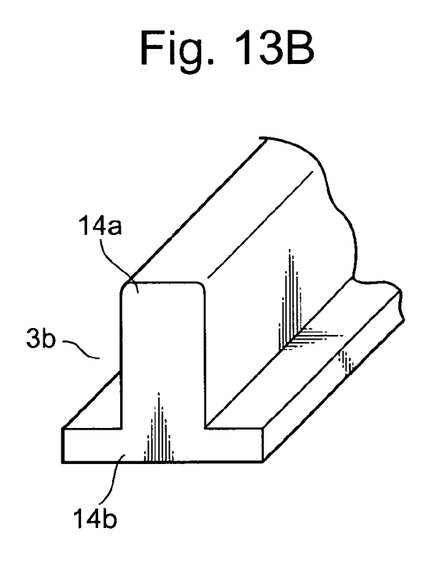

FIG. 13A and FIG. 13B are perspective views of modified examples of the elastic member shown in FIG. 12. Meanwhile, FIG. 14 is a perspective view showing still another modified example of the elastic member in FIG. 12.

As shown in FIG. 13A and FIG. 13B, these elastic members 3b represent modifications of the peak portions 14a into rounded (or oval), or cornered shapes. These elastic members 3b can obtain similar effects to the dust-proof effect according to the liquid crystal display modules 12 of the respective embodiments adopting the above-described elastic member 3b shown in FIG. 12. Accordingly, it is possible to modify the elastic member 3b into various aspects in response to the structure inside the liquid crystal display module, formability, and a target price.

Moreover, as shown in FIG. 14, the peak portion 14a of this elastic member 3b protrudes from an end of the fixing portion 14b, thereby forming across section of an approximately L-shape. This elastic member 3b also has similar dust-proof and other effects to those described in FIG. 13A and FIG. 13B.

FIG. 15A is an exploded perspective view of a liquid crystal display module for describing a sixth exemplary embodiment of the present invention. As shown in FIG. 15A, the liquid crystal display module 12 of this embodiment adopts the above-described elastic member 3b shown in FIG. 14. Specifically, this liquid crystal display module 12 assumes a case of fixing the elastic member 3b to the front surface of the back light 11a or 11b opposed to the liquid crystal panel 2 so as to surround the display surface of the liquid crystal panel 2. In this case, in each portion 21 in which the respective linear elastic members 3b fixed in the periphery of the back light 11a or 11b abut on each other, this liquid crystal display module 12 is configured to seal the space between the liquid crystal panel 2 and the optical sheet 5 hermetically from outside (see FIG. 15B). In this way, it is possible to further enhance the dust-proof property of the liquid crystal display module 12.

It is needless to say that the peak portion 14a of the elastic member 3b shown in FIG. 14 may have the triangular, rounded (or oval), or cornered cross section as shown in FIG. 12, FIG. 13A, and FIG. 13B. In this case, it is also possible to obtain the dust-proof property and the like which are similar to the liquid crystal display modules 12 according to the above-described first to fifth exemplary embodiments of the present invention.

Figure 16:
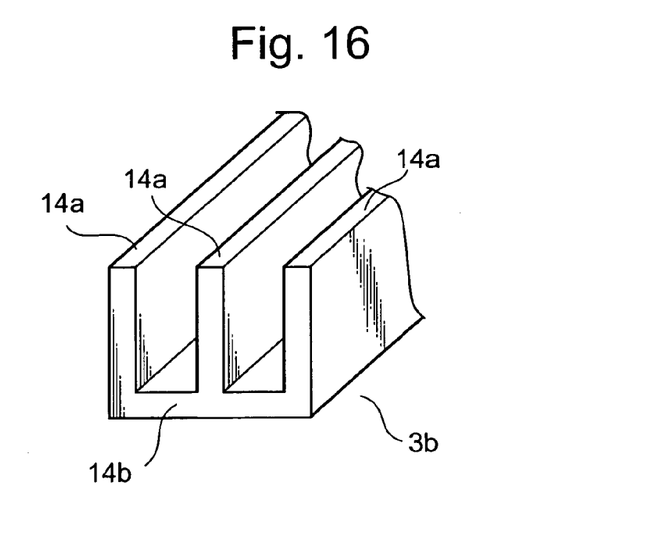
FIG. 16 is a view showing still another modified example of the elastic member in FIG. 12.

FIG. 16 is a perspective view showing still another modified example of the elastic member in FIG. 12. As shown in FIG. 16, this elastic member 3b further improves the dust-proof property of the liquid crystal display module 12. Specifically, this is an example of arranging a plurality of peaked portions 14a on one fixing portion 14b formed in common. In this way, contact points and contact areas of the peak portions 14a of the elastic member 3b contacting the liquid crystal panel 2 or the intermediate frame 4b are increased. Accordingly, intrusion of dust is prevented in stages at the respective contact points. It is possible to further enhance the dust-proof effect of the liquid crystal display modules 12 according to the respective embodiments described above, and to achieve the same degrees of the vibration resistant and impact resistant properties as well. Of course, the cross-sectional shape of each of the peak portions 14a provided in multiple positions of this elastic member 3b is not limited only to the cornered shape. It is also possible to form each of the peak portions 14a into a rounded, oval, or triangular shape.

Figure 17A:
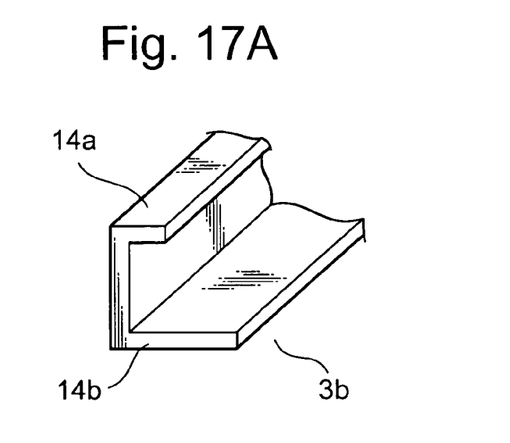
FIGS. 17A to 17C are views showing yet other examples of the elastic member in FIG. 12.
Figure 17B:
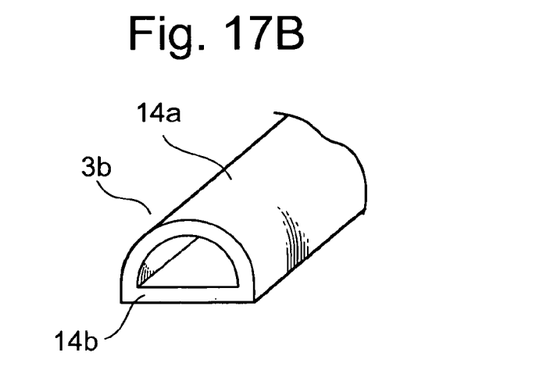
Figure 17C:
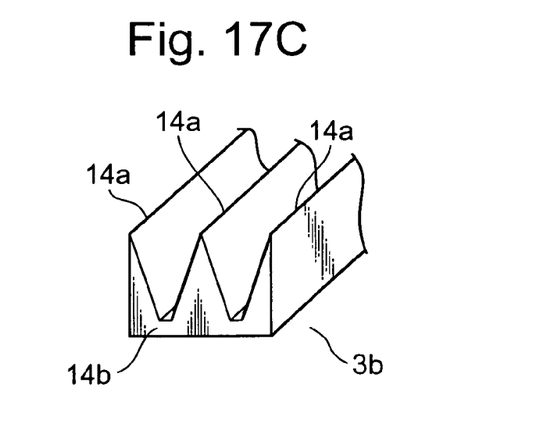

FIG. 17A to FIG. 17C are views showing yet other examples of the elastic member in FIG. 12. As shown in FIG. 17A, the elastic member 3b can be structured by combining an L-shape and an inverted L-shape. Meanwhile, it is also possible to form the elastic member 3b into a dome shape as shown in FIG. 17B, or into a structure forming sharp peaks as shown in FIG. 17C. By use of these elastic members 3b as well, it is possible to obtain the dust-proof effect and vibration resistant and impact resistant properties equivalent to the liquid crystal display modules 12 adopting the above-described elastic members 3b as shown in FIG. 12 to FIG. 14 and in FIG. 16 owing to flexibility of the peaked portions 14a.

As described above, the liquid crystal display module and the back light for the same of the present invention can achieve the dust-proof, vibration resistant, and impact resistant properties higher than those in a conventional liquid crystal display module by utilizing the elastic peak portions. Particularly, in the liquid crystal display module adopting the direct back light, it is possible to replace lamps easily while maintaining the dust-proof property. In this way, it is possible to achieve the highly reliable liquid crystal display module and the back light while maintaining display quality.

It is apparent that the present invention is not limited to the above exemplary embodiments, but may be modified and changed without departing from the scope and spirit of the invention.

Further, the inventor's intent is to retain all equivalents of the claimed invention even if the claims are amended during prosecution.

What is claimed is:

1. A liquid crystal display module comprising:
   a liquid crystal panel;
   a back light for functioning as a light source and mounting the liquid crystal panel;
   an upper frame for surrounding and protecting the liquid crystal panel and the back light; and
   an elastic member having flexibility and being fitted to any one of a front surface of the back light and a rear surface of the back light to surround a display portion of the liquid crystal panel,
   wherein a peak portion of the elastic member contacts the liquid crystal panel to hermetically seal a gap between the liquid crystal panel and the back light.

2. The liquid crystal display module according to claim 1, wherein the elastic member is fitted to at least one edge of the front surface of the back light corresponding to a periphery of the display portion of the liquid crystal panel.

3. The liquid crystal display module according to claim 1, wherein the elastic member is fitted to at least one edge of the rear surface of the back light corresponding to a periphery of the display portion of the liquid crystal panel.

4. The liquid crystal display module according to claim 1, wherein the elastic member comprises:
   a first elastic member having flexibility and being fitted to the front surface of the back light to surround the display portion of the liquid crystal panel; and
   a second elastic member having flexibility and being fitted to the rear surface of the upper frame for protecting the liquid crystal panel to surround the display portion of the liquid crystal panel, and
   peaked portions of the first and second elastic members are respectively brought into contact with the liquid crystal panel to hermetically seal a gap between the liquid crystal panel and the back light and a gap between the upper frame and the liquid crystal panel.

5. The liquid crystal display module according to claim 4, wherein the first and second elastic members are fitted to at least one edge of the front surface of the back light and to at least one edge of the rear surface of the upper frame respectively corresponding to a periphery of the display portion of the liquid crystal panel.

6. The liquid crystal display module according to claim 1, wherein the elastic member is made of resin having flexibility and elasticity.

7. The liquid crystal display module according to claim 6, wherein the resin is silicone rubber.

8. The liquid crystal display module according to claim 1, wherein the elastic member is formed into a shape to allow the peak portion thereof to be any one of deformed and tilted when the peak portion is brought into contact with an opposed member, in order to hermetically seal a gap between a fitting member to be fitted and the opposed member to be opposed to the fitting member while suppressing a load on the opposed member.

9. A back light for a liquid crystal display module, comprising:
    direct lamps arranged parallel to a display surface;
    a reflector for reflecting light emitted from the lamps and directing the light to a display side through a diffuser;
    a lower frame for housing the direct lamps and the reflector;
    a lamp holder set rendered detachable outward from the liquid crystal display module; and
    an elastic member having flexibility for hermetically sealing a gap between the lamp holder set and an intermediate frame,
    wherein the elastic member is fitted to any of a front side surface of the lamp holder set and a rear side surface of the intermediate frame constituting a frame after detaching the lamp holder set.

10. The back light for a liquid crystal display module according to claim 9, wherein the elastic member is fitted to at least one edge of a front surface of the back light corresponding to a periphery of a display portion of a liquid crystal panel.

11. The back light for a liquid crystal display module according to claim 9, wherein the elastic member is fitted to at least one edge of a rear surface of the back light corresponding to a periphery of a display portion of a liquid crystal panel.

12. The back light for a liquid crystal display module according to claim 9, wherein the elastic member comprises:
    a first elastic member having flexibility and being fitted to a front surface of the back light to surround a display portion of a liquid crystal panel; and
    a second elastic member having flexibility and being fitted to a rear surface of an upper frame for protecting the liquid crystal panel to surround the display portion of the liquid crystal panel, and
    peaked portions of the first and second elastic members are respectively brought into contact with the liquid crystal panel to hermetically seal a gap between the liquid crystal panel and the back light and a gap between the upper frame and the liquid crystal panel.

13. The back light for a liquid crystal display module according to claim 12, wherein the first and second elastic members are fitted to at least one edge of the front surface of the back light and to at least one edge of the rear surface of the upper frame respectively corresponding to a periphery of the display portion of the liquid crystal panel.

14. The back light for a liquid crystal display module according to claim 9, wherein the elastic member is made of resin having flexibility and elasticity.

15. The back light for a liquid crystal display module according to claim 14, wherein the resin is silicone rubber.

16. The back light for a liquid crystal display module according to claim 9, wherein the elastic member is formed into a shape to allow a peak portion thereof to be any one of deformed and tilted when the peak portion is brought into contact with an opposed member, in order to hermetically seal a gap between a fitting member to be fitted and the opposed member to be opposed to the fitting member while suppressing a load on the opposed member.

* * * * *